US008165963B2

(12) United States Patent
Foster

(10) Patent No.: US 8,165,963 B2
(45) Date of Patent: Apr. 24, 2012

(54) LICENSE SCHEME FOR USE WITH STACKABLE DEVICES

(75) Inventor: Gregory Foster, Gilroy, CA (US)

(73) Assignee: Avaya Inc., Basking Ridge, NJ (US)

( * ) Notice: Subject to any disclaimer, the term of this patent is extended or adjusted under 35 U.S.C. 154(b) by 463 days.

(21) Appl. No.: 12/226,824

(22) PCT Filed: Jun. 30, 2006

(86) PCT No.: PCT/US2006/025703
§ 371 (c)(1),
(2), (4) Date: Oct. 28, 2008

(87) PCT Pub. No.: WO2007/130103
PCT Pub. Date: Nov. 15, 2007

(65) Prior Publication Data
US 2010/0235921 A1 Sep. 16, 2010

Related U.S. Application Data

(60) Provisional application No. 60/797,602, filed on May 4, 2006.

(51) Int. Cl.
*H04K 1/00* (2006.01)
*H04L 9/00* (2006.01)
(52) U.S. Cl. ............... 705/59; 705/51; 705/57; 705/58; 705/71; 705/75
(58) Field of Classification Search ............... 705/59
See application file for complete search history.

(56) References Cited

U.S. PATENT DOCUMENTS

| 2002/0026424 A1* | 2/2002 | Akashi ......................... 705/57 |
| 2003/0035641 A1* | 2/2003 | Sucharczuk et al. .......... 385/124 |
| 2004/0054930 A1 | 3/2004 | Walker et al. |
| 2006/0004668 A1 | 1/2006 | Hamnen et al. |
| 2006/0085354 A1* | 4/2006 | Hirai ............................ 705/59 |
| 2006/0106727 A1* | 5/2006 | Yellai et al. .................. 705/59 |
| 2010/0241568 A1* | 9/2010 | Yellai et al. .................. 705/59 |

OTHER PUBLICATIONS

International Search Report issued on Feb. 26, 2007 in International Application No. PCT/US2006/025703.
Written Opinion of the International Searching Authority issued on Feb. 26, 2007 in International Application No. PCT/US2006/025703.

* cited by examiner

*Primary Examiner* — Calvin L Hewitt, II
*Assistant Examiner* — Dante Ravetti
(74) *Attorney, Agent, or Firm* — Chapin IP Law, LLC; David W. Rouille

(57) ABSTRACT

A method (300), system (100) and apparatus (200) are provided that enable selected features in a group of two or more devices. A first of the devices (102A) receives a license (306) identifying features to be enabled. The first device (102A) transmits the license (308) to other devices in the group (102B, 102C). The devices in the group (102A-102C) enable selected features (312), according to the license, from features that are available in all the devices in the group. The license may be encrypted (302) and the devices decrypt the license (310) before enabling the selected features (312). The license may be modified (302) using an identifier associated with the first device (102A) of the group and the first device transmits the identifier (308) to the other devices in the group, along with the encrypted license. The devices authorize the license (310) using the transmitted identifier.

8 Claims, 2 Drawing Sheets

LICENSE SCHEME FOR USE WITH STACKABLE DEVICES

CROSS-REFERENCE TO RELATED APPLICATION(S)

The present application claims priority under 35 U.S.C. §365 to International Patent Application No. PCT/US2006/025703 filed Jun. 30, 2006, entitled "LICENSE SCHEME FOR USE WITH STACKABLE DEVICES" and claims priority under 35 U.S.C. §119(e) to U.S. provisional Patent Application No. 60/797,602 filed May 4, 2006, which are incorporated herein by reference.

TECHNICAL FIELD

This disclosure relates generally to stackable devices and more specifically to an device, method, and system for distributing a license enabling selected features in stackable devices.

BACKGROUND

Multiple similar devices (for example, Ethernet switches) may be communicatively coupled to each other to form a so-called "stack" of devices. Typically, one of these network devices serves as the main controller or "base-unit" of the stack responsible for controlling the stack formation, maintaining and distributing configuration parameters, and handling configuration requests. Once the stack is formed, a single network address can be used to access the management entity on the base-unit, which can be reached through any network port of the devices making up the stack. Furthermore, the devices in a stack are typically capable of detecting and communicating a failure of another device in the stack and adapting their functionality accordingly. In this way, a stack of devices may provide continued functionality despite a failure of one or more devices in the stack.

Where the stack of devices are all Ethernet switches, each switch may provide a different number of Ethernet ports (e.g., typically anywhere from 12 to 48 ports) or ports with different physical characteristics, such as speed (e.g., 10Base-T, 100Base-T, 10 GbE), media type (e.g., copper, fiber), or capabilities (e.g., power-over-ethernet (POE)). Thus, a stack of such switches present a grouping of all these ports into one system managed as a single entity.

Certain features of a stackable device may be determined, in part, by the hardware of the device. For example, the number of ports that a stackable Ethernet switch supports or whether the switch supports POE. However, other features of the stackable device may be determined by the software or firmware installed in the device. For example, an Ethernet switch's network security features, or its response to hardware or network failures, are often determined by its software. Thus, the features of a stackable device may be hardware or software features.

A manufacturer may offer a product line with related products having differing hardware or software features, and differing prices, but common elements in the hardware platform. Typically, such a manufacturer creates a different software release for each product in the product line. The software release for each product includes only the features offered by that product.

A customer that needs, and is willing to pay for, only a subset of the hardware or software features of a particular product, presents such a manufacturer with a difficult decision. The manufacturer may refuse to change its product line, thereby forcing the customer to buy more features than are needed. Or, the manufacturer may create yet another product in the product line, including in the software only those features desired by the customer. Choosing the second solution requires the manufacturer to support an ever-increasing number and variety of software versions.

There is, therefore, a need for a method of enabling in a plurality of stackable devices only those features that a customer has chosen to purchase.

SUMMARY

This disclosure provides a device, method, and system for distributing a license enabling selected features in stackable devices.

In accordance with one embodiment, there is provided a method of enabling selected features in a group of two or more devices. The method includes receiving at one of the devices a license identifying features to be enabled. The device transmits the license to other devices in the group, and the devices in the group enable selected features according to the license. The enabled features are features that are available in all of the devices in the group.

In accordance with another embodiment of the invention, a system includes a group of devices that each have features that are available in all of the devices in the group. One of the devices in the group is adapted to receive a license identifying features to be enabled and transmit the license to the other devices in the group. The devices in the group enable selected features according to the license.

In yet another embodiment, there is provided an apparatus including a processor and a memory coupled to the processor. The memory includes one or more features. The apparatus also includes an inter-device communication interface that is adapted to enable communication between the processor and processors of one or more other similar apparatuses. The apparatus further includes network communication interface coupled to the processor. The apparatus is adapted to receive a license identifying features to be enabled by way of either the inter-device communication interface or the network communication interface. The apparatus is also adapted to enable selected features from the plurality of features in the memory according to the license. Furthermore, the apparatus is adapted to transmit by way of the inter-device communication interface a license received at the network communication interface.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
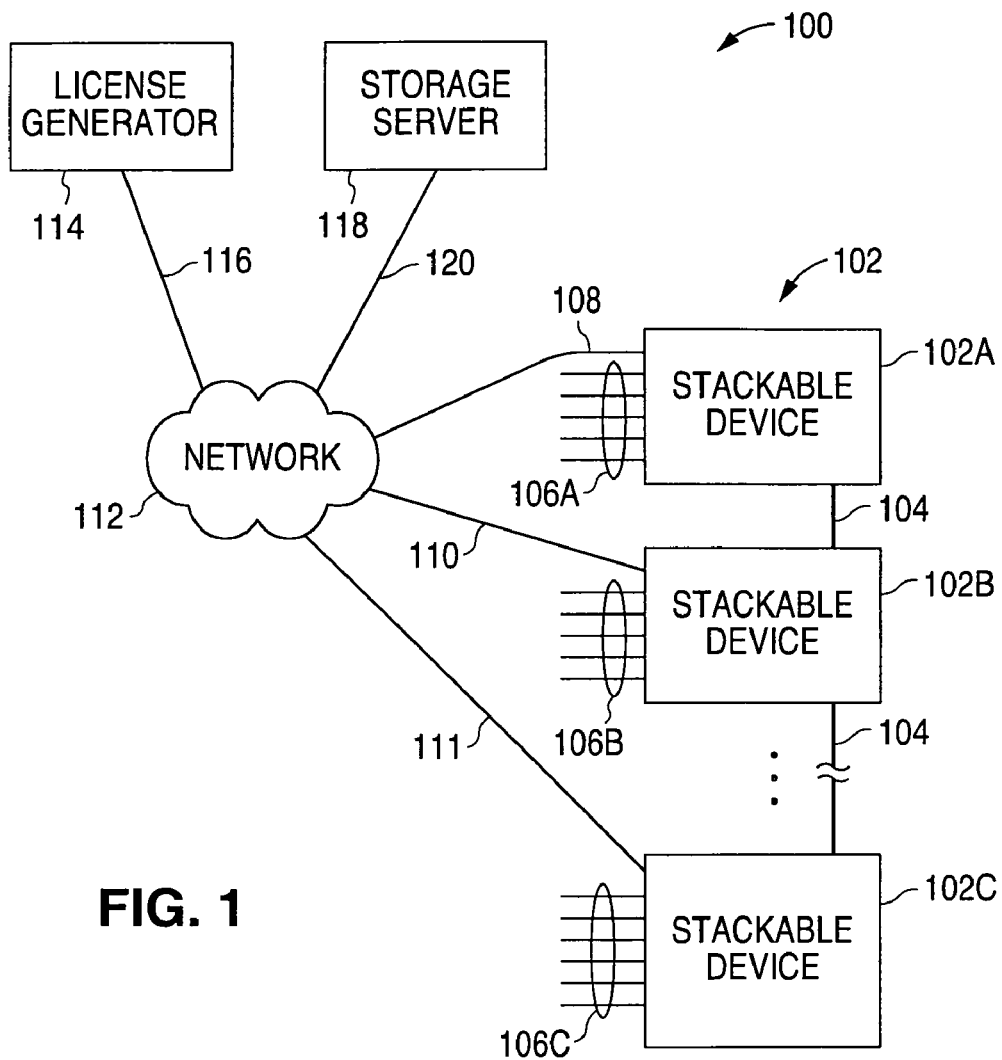
FIG. 1 depicts a system of stackable devices in accordance with an embodiment of the present invention.
Figure 2:
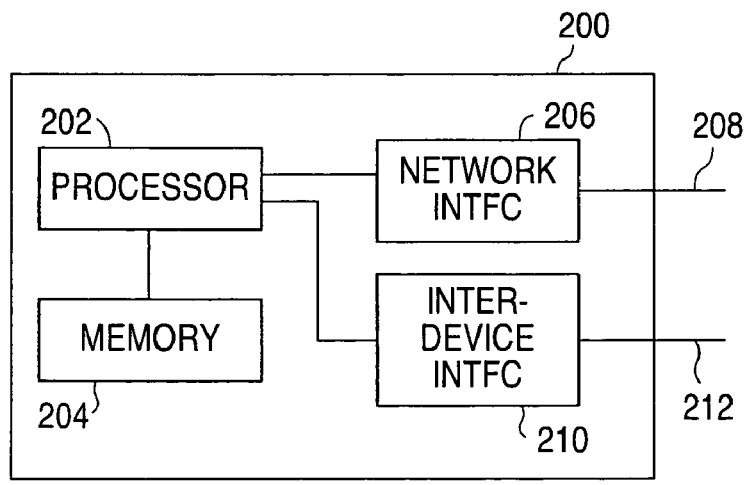
FIG. 2 depicts a stackable device, in accordance with an exemplary embodiment of the present invention.
Figure 3:
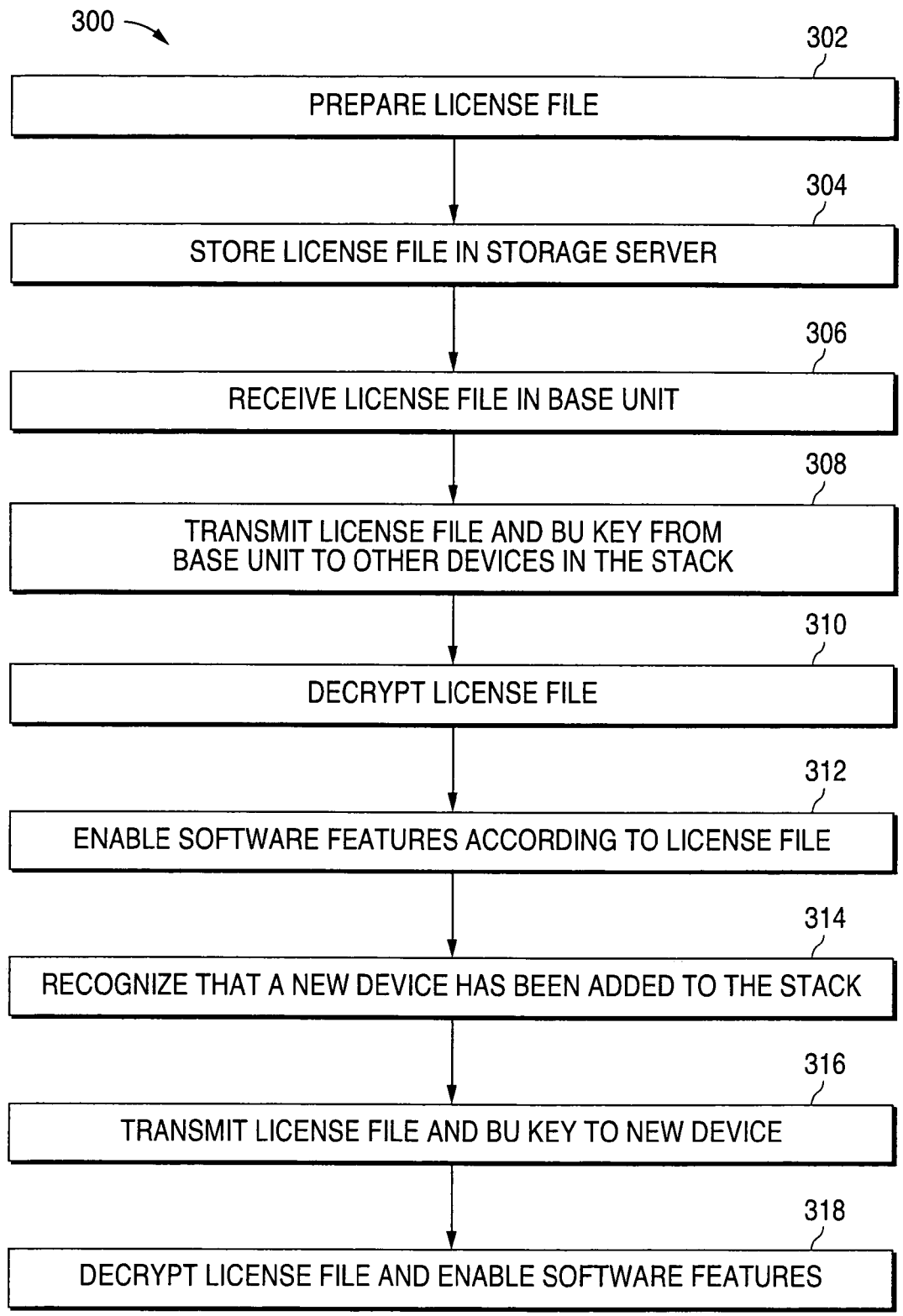
FIG. 3 depicts a flowchart of a process to distribute a license to enable selected features in a system of stackable devices in accordance with an embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

This disclosure provides a device, method, and system for distributing a license enabling selected features in stackable devices.

FIG. 1 depicts a system 100 of stackable devices in accordance with an embodiment of the present invention. The system 100 may include a plurality of stackable devices 102A-102C that form a stack 102. The stackable devices 102A-102C may be capable of communicating with each other via a communication link 104. In one embodiment of the present invention, the stackable devices 102A-102C may be Ethernet switches, each with a plurality of Ethernet ports 106A-106C. In other embodiments, the stackable devices 102A-102C may be ATM switches, token ring switches or routers.

The stackable devices 102A, 102B and 102C may be network devices that include network communication links 108, 110 and 111, respectively, to enable communication with other devices of the system 100 via a network 112. In this way, the stackable devices 102A-102C may be enabled and configured for operation as desired by a system operator. In system 100, the stackable devices 102A-102C may be coupled to the network 112, allowing them to communicate with a license generator 114 and a storage server 118 via network communication links 116 and 120, respectively.

While the communication link 104 and the network communication link 108 and 110 are shown as separate links in FIG. 1, in another embodiment of the invention, the stackable devices 102A-102C may communicate with each other via the network 112 using network communication links such as links 106, 108, 110 and 111.

Typically, one of the stackable devices, for example 102A, may be adapted to serve as the base unit for the stack 102. Other devices in the system 100 may then communicate with the stackable devices 102A-102C by using a network address of the stackable device 102A. A network message intended for stackable device 102B or 102C may be relayed by the stackable device 102A to the intended recipient via the communication link 104.

In the system 100, in accordance with an embodiment of the present invention, the stackable devices 102A-102C are provided with software and hardware having a plurality of features, or functions. The stackable devices 102A-102C may be identical, in which case the software and hardware of the devices may also be identical. In other embodiments of the invention, though, the stackable devices 102A-102C may be similar, rather than identical. In the case of Ethernet switches, for example, the devices may have differing numbers of Ethernet ports or Ethernet ports employing differing physical transmission protocols. Nonetheless, such differing stackable devices may share software or hardware that implements certain features. Certain hardware or software features of the stackable devices 102A-102C may be disabled until a license file is loaded into the devices that enables one or more of the disabled features. In this way, a manufacturer of the stackable devices 102A-102C may simplify its manufacturing process by producing only a limited number of versions of software and hardware for the devices, while offering its customers options in functionality and pricing of the devices.

The storage server 118 may store the license file, so that at power up, the base unit stackable device 102A may load the license file via the network 112 and the network communication links 120 and 108. In a process to be described in greater detail with reference to FIG. 3, the stackable device 102A may then transmit the license file to the remaining stackable devices 102B and 102C. All of the stackable devices 102A-102C may then enable selected features from the software and hardware of the devices, according to information in the license file.

To prevent an operator of the system 100 from altering the license file to enable features that have not been paid for, the manufacturer of the stackable devices 102A-102C may encrypt the license file. The license generator 114 may perform this encryption once, and then load the encrypted license file to the storage server 118 for subsequent use by the stackable devices 102A-102C. This encryption may be performed with one or more keys stored only in the license generator 114 and the stackable devices 102A-102C.

Furthermore, in an embodiment of the present invention where a system includes two or more stacks, the manufacturer may require the system operator to purchase a license for each of the stacks. In such a system, the license for the stack 102 may include a unique identifier associated with the stackable device 102A and stored only in the license generator 114 and the stackable device 102A, for the purpose of authorizing the license for use with the stack containing the device 102A. In this way, a license file intended for the stack 102 cannot be used in a second stack, because the base unit stackable device of the second stack does not have the unique identifier associated with the stackable device 102A needed to authorize the license file. A license file containing such a unique identifier may also contain validation data, such as a checksum, for the stackable devices to use in detecting tampering with the license file. A license file including a unique identifier (with or without validation data) may furthermore be encrypted.

In other embodiments of the invention, the unique identifier may be combined with the one or more encryption keys for use in the encryption and decryption processes. In such embodiments, a stackable device may decrypt and authorize a license file in a single process. In still other embodiments, after encryption with either the encryption key(s) or the unique identifier, the encrypted license file may be re-encrypted with the other of the encryption key(s) or the unique identifier. In such embodiments, the license file may be authorized by a decryption process Thus, in differing embodiments of the invention, the license file may be modified using a unique identifier of a stackable device by including the identifier as data in the license file or using the identifier as part of a key for encrypting the license file. Similarly, a stackable device may authorize a license file in differing embodiments of the invention by decrypting the file using a key including a unique identifier of a stackable device or determining whether the identifier is included as data in the license file.

The remaining stackable devices in the stack 102 may not have the unique identifier associated with the stackable device 102A needed to authorize the license file. For this reason, the stackable device 102A may transmit its unique identifier to the stackable devices 102B and 102C along with the license file. In this way, the stackable devices 102B and 102C may decrypt and authorize the license file and enable the features selected by the license file.

Should the stackable device 102A fail while the stack 102 is in operation, one of the remaining stackable devices, for example device 102B, may be capable of temporarily assuming the duties of the base unit for the stack 102. Should an additional stackable device be added to the stack 102 by connecting it to the communication link 104, in order to add functionality to the stack or to replace the functionality of the failed device 102A, the stackable device 102B may transmit to the new stackable device the license file, in order to enable in the new device the same features enabled in the other devices of the stack 102. Where the license file must be authorized, the stackable device 102B may also transmit to the new device the unique identifier of the failed device 102A, to enable the new device to authorize the license file.

The stack 102 may be able to continue operating with a temporary base unit while the stackable devices of the stack remain powered up. However, typically, when the devices are reset or powered off and back on while the original base unit is non-functional, one of the remaining stackable devices 102B or 102C may be adapted to be signaled by the system operator to serve as the base unit of the stack 102. This signaling may be done by activating a switch on the stackable device 102B or 102C chosen as the new base unit.

In addition to authorizing the license file with the unique identifier associated with the stackable device 102A, the manufacturer may take an additional security precaution of programming the stackable devices that are not serving as base units to erase any received unique identifier and license file when the device is reset, or when the device is powered off and back on. If such devices are reset without the stackable device 102A in the stack (for example, after it has failed) the remaining stackable devices 102B and 102C will be unable to use a license file requiring authorization as described above to enable their features.

In order to provide for such a circumstance, the license for the stack 102 may be modified with unique identifiers associated with one or more of the stackable devices 102B and 102C. In this way, any stackable device whose unique identifier is used to modify the license file may be used by the system operator as the new base unit for the stack upon a failure of the original base unit stackable device. As described above for the original base unit, the new base unit 102B may be capable of receiving a license file via network communication link 110 or may have stored the license file in non-volatile memory. It may then transmit the license file to any other stackable devices in the stack via communication link 104, along with its own unique identifier, if needed to authorize the license file.

Turning to FIG. 2, a stackable device 200, in accordance with an exemplary embodiment of the present invention, is shown. The stackable device 200 may include a processor 202 coupled to a memory 204. The processor 202 may execute programs stored in the memory 204. The stackable device 200 may also include a network communication interface 206 adapted to couple the processor 202 to a network communication link 208. The network communication link 208 may be used by the stackable device 200 to communicate, for example, with the storage server 118 of FIG. 1. The stackable device 200 may also include an inter-device communication interface 210 capable of coupling the processor 202 to the communication link 212. The communication link 212 may be used by the stackable device 200 to communicate with other stackable devices in its stack.

The memory 204 may include both volatile and non-volatile memory. The unique identifier associated with the stackable device 200 may be stored in non-volatile memory. The processor 202 may store in the memory 204 a license file and any unique identifier associated with a base unit of the stack received via the network communication link 208.

The license file may be stored in non-volatile memory, while the unique identifier with the base unit of the stack is stored in volatile memory. In this way, after power is removed from a non-base unit stackable device, the device will have to reestablish communication with the base unit of the stack to obtain the identifier needed to decrypt the license file. Conversely, the manufacturer may cause the stackable device either to retain or erase the license file from non-volatile memory at start up.

FIG. 3 depicts a flowchart of a process 300 to distribute a license to enable selected features in a system of stackable devices in accordance with an embodiment of the present invention. The process 300 begins with preparing a license file in step 302. As described above, in some embodiments of the invention, a license file may remain unencrypted. In other embodiments, the license file may be encrypted with one or more keys known only to a license encryption device and the stackable devices of the system. In still other embodiments, the license file may be modified with one or more unique identifiers associated, respectively, with one or more stackable devices of a stack in the system. In other embodiments, the license file may include license validation data, such as a checksum, to enable a stackable device to detect tampering with the license file.

The process 300 then continues with an optional step 304 of storing the license file in a storage server of the system. In other embodiments of the invention, the license file may be stored in a license generator or in any other device of the system that is capable of transmitting the license file to a base unit stackable device upon request. In still other embodiments, the license file may be stored in a portable memory device (such as a FLASH card or memory stick) that may be physically carried to the base unit to download the license file.

When a base unit stackable device is reset or powered up, it may request and receive a license file from a network device or may retrieve the license file from local non-volatile memory, in step 306. The base unit may then transmit the license file to any other stackable devices in its stack, in step 308. In an embodiment where the license file is encrypted with a key that includes a unique identifier associated with the base unit, step 308 may also include the base unit retrieving and transmitting its unique identifier to the other stackable devices.

Once a stackable device has received a license file, optional step 310 may be performed to decrypt the license file, if necessary. The step 310 may also include authorizing or validating the license file. In step 312, the stackable device may use the license file to enable selected features from a suite of features available in the device.

Should a new device be added to the stack (for example, to increase the number of ports in the stack, or to replace a failed device in the stack) the base unit of the stack may recognize the addition of the new device in step 314. Where it is the original base unit of the stack that fails, it may be a new, temporary base unit of the stack that recognizes the addition of a new device to the stack. In step 316, the base unit may transmit to the new device the license file and any unique identifier required to decrypt the license file. Finally, in step 318, the new device may decrypt, authorize or validate the license file, if needed, and enable features according to information in the license file.

Those skilled in the art will appreciate that at least portions of the mechanism of the present invention are capable of being distributed as a computer program product in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of enabling features in a stack of devices where each device in the stack at least initially has disabled features, wherein a first device in the stack also stores a first device identifier in its memory, the method comprising:
   receiving a first encrypted license file by the first device in the stack wherein the license file comprises the first device identifier;
   decrypting the first encrypted license file by the first device using the first device identifier from its memory;
   enabling features in the first device by the first device using the decrypted license file;
   determining by the first device that a second device is in the stack, encrypting by the first device the license file using the first device identifier and transmitting by the first device the first device identifier and the encrypted license file to the second device;
   decrypting the encrypted license file by the second device using the transmitted first device identifier, authorizing by the second device the decrypted license file by determining that the transmitted first device identifier is in the decrypted license file and enabling features in the second device using the decrypted license file.

2. The method as in claim 1, further comprising:
   at the first device:
   receiving a message transmitted to an intended recipient device in the stack; and
   transmitting the message from the first device to the intended recipient in the stack.

3. The method as in claim 1 further comprising:
   in a device designated as a non-base unit in the stack:
   storing a unique key in volatile memory;
   storing the license file in non-volatile memory; and
   subsequent to removal of power to the non-base unit, re-establishing communication with the first device in the stack to retrieve the unique key.

4. The method as in claim 1,
   wherein the devices in the stack enable selected features according to the license file based on use of the license by each of the devices in the stack; and
   wherein features enabled by the devices in the stack are features that are available to all of the devices in the stack.

5. The method as in claim 1, wherein each of multiple features identified in the license file are supported by all of the devices in the stack.

6. The method as in claim 1, wherein the stack of devices includes a third device; and
   wherein the first device is a base unit that communicates with other devices in the stack, the method further comprising:
   receiving a network message at the first device;
   transmitting the network message from the first device on a communication link through the second device to the third device in the stack.

7. The method as in claim 1, wherein each of the devices in the stack supports a set of identical features; and
   wherein the license file specifies which features in each of the devices to enable based on loading of the license file into the devices in the stack.

8. The method as in claim 7, wherein resetting of the stack of devices, during which the first device fails, renders the second device in the stack unable to use the license file to enable features.

* * * * *